United States Patent [19]
Lake

[11] Patent Number: 6,120,087
[45] Date of Patent: Sep. 19, 2000

[54] AESTHETIC COVER FOR CONVERTIBLE TOPS

[76] Inventor: Martha H. Lake, 5560 Camino Real, Vero Beach, Fla. 32967

[21] Appl. No.: 09/054,623

[22] Filed: Apr. 3, 1998

[51] Int. Cl.⁷ .......................................................... B60J 7/20
[52] U.S. Cl. ...................................... 296/136; 296/107.11
[58] Field of Search ............................... 296/136, 107.11, 296/107.05; 160/327, 354, 368.1

[56] References Cited

U.S. PATENT DOCUMENTS

| | | |
|---|---|---|
| 2,479,825 | 8/1949 | Fleischhauer . |
| 2,619,919 | 12/1952 | Dvorkin . |
| 2,623,481 | 12/1952 | Muciaccia et al. . |
| 2,765,192 | 10/1956 | Blake . |
| 3,175,859 | 3/1965 | Abodeely . |
| 3,241,877 | 3/1966 | Tate . |
| 3,328,073 | 6/1967 | Einhorn . |
| 4,606,573 | 8/1986 | Schneider ................. 296/210 |
| 4,757,854 | 7/1988 | Rippberger .............. 160/391 |

*Primary Examiner*—Dennis H. Pedder
*Assistant Examiner*—Mickki D. Murray
*Attorney, Agent, or Firm*—Ronald E. Smith; Smith & Hopen

[57] ABSTRACT

A decorative cover for a convertible top is clipped onto an existing convertible top to enhance the aesthetic appeal of a convertible top automobile. The leading edge of the decorative cover member is secured to a molded boot that frictionally engages the leading end of the existing convertible top. The molded boot is one continuous part to prevent air from getting into a space between the existing convertible top and the decorative cover member. A plurality of side clips are used to clip the sides of the decorative cover member to the sides of the existing convertible top. The decorative cover member is sewn or adhered to a preselected surface of each of the side clips. The trailing edge of the decorative cover member is clipped to the storage well or other available part of the automobile.

15 Claims, 2 Drawing Sheets

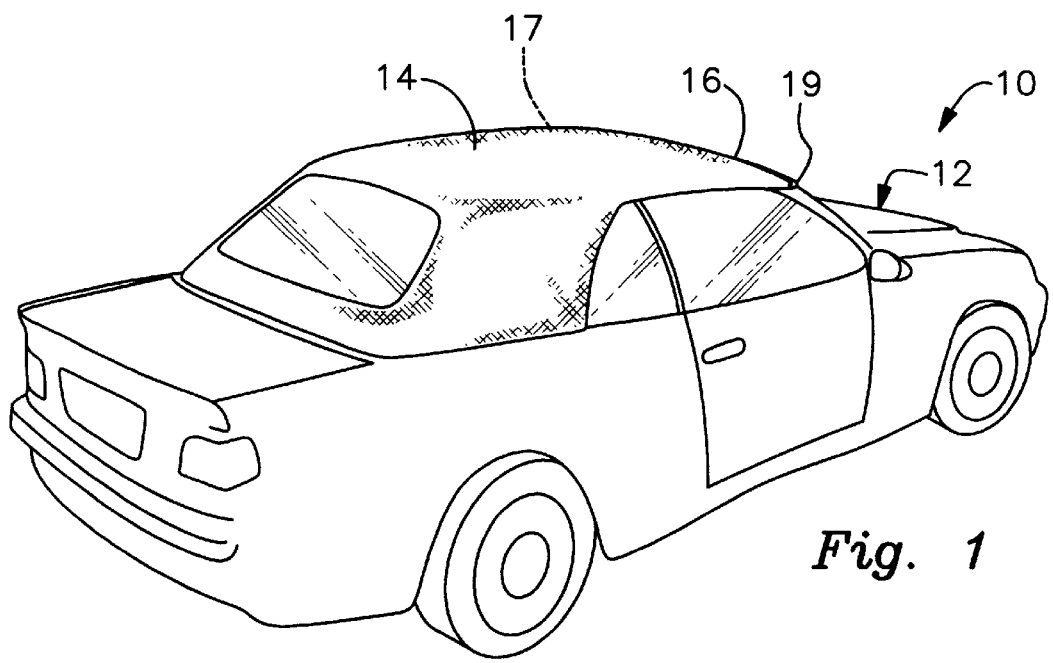
Fig. 1
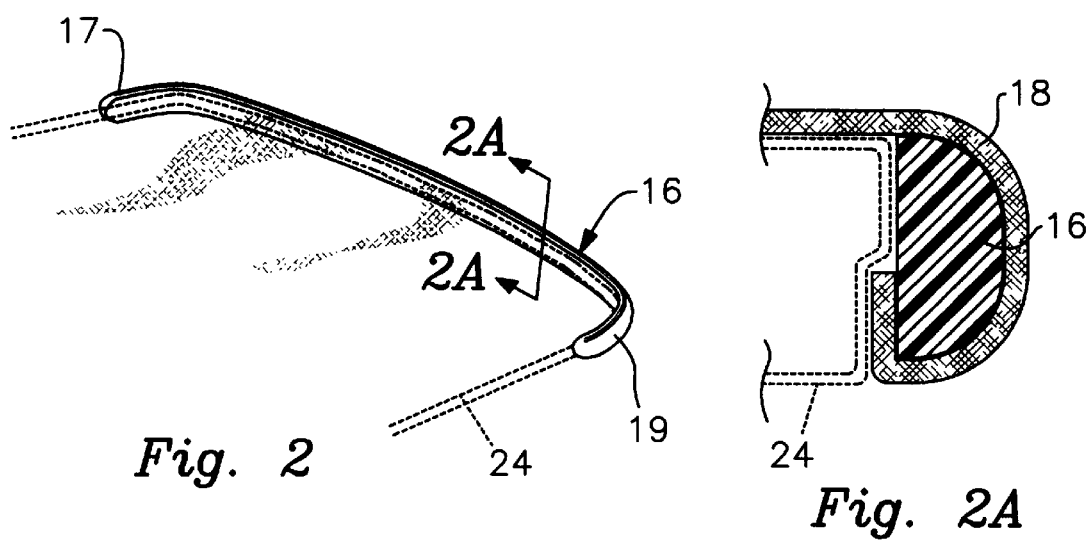
Fig. 2
Fig. 2A

AESTHETIC COVER FOR CONVERTIBLE TOPS

BACKGROUND OF THE INVENTION

1. Field of the Invention

This invention relates, generally, to aesthetic but utilitarian devices that enhance the appearance of structures lacking artistic appeal. More particularly, it relates to a cover for automobile convertible tops that enables a convertible owner to artistically decorate a bland convertible top.

2. Description of the Prior Art

Automobiles of the convertible type include flexible tops that are foldable and storable in a storage well that is typically located at the rear of the passenger compartment. The tops are typically made of vinyl, canvas or a similar material. They are popular because they closely simulate the comfort and protection from the elements of a hard top when in their raised configuration, yet allow passengers to enjoy sunlight, fresh air, and other benefits when in their lowered configuration.

Although convertibles have been sold for decades, the manufacturers thereof have persisted in making convertible tops in solid colors, usually gray, black, white or brown. Accordingly, there are many buyers who would like more variety.

There is a need, then, for convertible tops of many different colors and designs. Manufacturers could provide more creative convertible tops, but the economics of mass production substantially prevents them from doing so. Thus, they continue to produce generic, solid-colored convertible tops.

It follows that the way to fulfill the need that exists is not obvious to those of ordinary skill in the art of convertible tops in view of the art considered as a whole at the time the present invention was made.

SUMMARY OF THE INVENTION

The long-standing but heretofore unfulfilled need for an apparatus that overcomes the limitations of the prior art is now met by a new, useful, and nonobvious invention. The present invention is a system for covering a pre-existing convertible top with a decorative cover to enhance the aesthetic appeal of a convertible top automobile. The system includes a first clip means in the form of a generally "C"-shaped molded boot that overlies and frictionally engages a leading edge of a pre-existing convertible top. It further includes a decorative cover member having substantially the same size and shape of the pre-existing cover; the decorative cover member is adapted to overlie the pre-existing convertible top. A leading edge of the decorative cover member is secured to the molded boot. A plurality of generally "U"-shaped side clip members is adapted to engage opposing side edges of the pre-existing convertible top and the decorative cover member is secured at spaced intervals along its opposing side edges to the side clip members. A generally "S"-shaped end clip secures a trailing edge of the decorative cover member to a pre-existing storage well of the convertible top automobile. The end clip may be provided in the form of a single clip having a breadth substantially equal to a breadth of the pre-existing convertible top, or it may be provided in the form of a plurality of "S"-shaped clip members, each of which has a breadth that is nominal compared to a breadth of the pre-existing convertible top.

It is a primary object of this invention to provide a system that enables a convertible top automobile owner to cover the existing convertible top with a decorative cover member having an enhanced aesthetic appeal vis a vis the aesthetic appeal of the existing convertible top.

Another object is to provide innovative clipping means that facilitates the attachment and removal of the decorative cover member.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of a convertible top automobile that is provided with a decorative cover member of this invention;

FIG. 2 is a perspective view of a first clip means in the form of a molded boot that engages a leading end of the decorative cover member;

FIG. 2A is a sectional view taken along line 2A—2A in FIG. 2;

DETAILED DESCRIPTION OF THE PREFERRED EMBODIMENT

Figure 3:
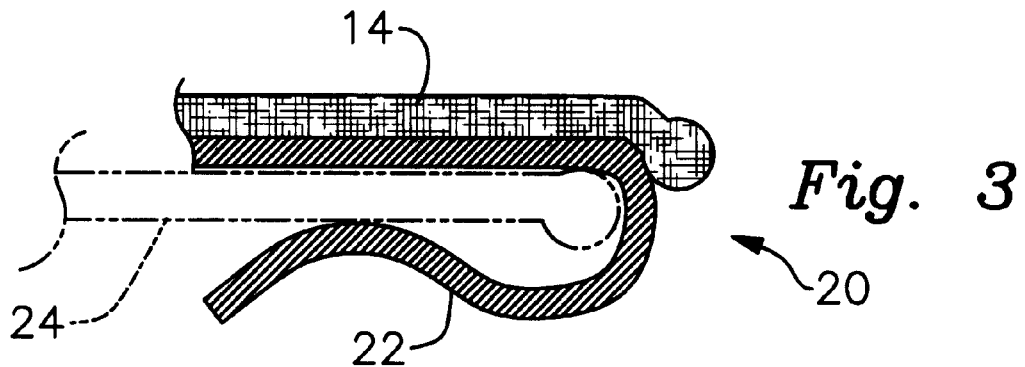
FIG. 3 is a side elevational view of one of a second clip means that secures opposing side edges of the decorative cover member to opposing side edges of the existing convertible top.

Referring now to FIG. 1, it will there be seen that the environment of the invention is denoted as a whole by the reference numeral 10. A convertible top automobile 12 has a pre-existing convertible top, not shown, made of a flexible, water-repellent fabric. A decorative cover member 14 having substantially the same size and shape of the pre-existing convertible top and being made of substantially the same material overlies said top and hides it from view. Although decorative cover member 14 is not depicted as being particularly decorative in FIG. 1, it should be understood that decorative cover member 14 is provided in an infinite number of artistic, aesthetically-appealing designs. It could be as simple as a plaid or tartan pattern, or it could include logos of sports teams, miscellaneous paintings, and the like, without limitation. A convertible owner could have a decorative cover member with a mountain scene, a beach scene, a purple top with yellow polka dots, or any other design, logo, scene, or pattern. Due to the low cost of decorative cover member 14 and the means for attaching it in overlying relation to the pre-existing convertible top, a car owner could own numerous decorative cover members and install them in accordance with the mood or whim of the moment. Sports-related covers could be used when driving to and from sporting events, Christmas-related covers could be used during the month of December, and so on.

First clip means 16 is depicted in FIG. 2. It is an elongate, molded boot formed of a substantially rigid but somewhat flexible and resilient material having a general "C"-shape. More particularly, it has a breadth substantially equal to the breadth of the pre-existing convertible top. Its opposite ends 17, 19 are curved in a common direction to frictionally engage the respective leading ends of the opposing side edges of the existing convertible top.

Significantly, the leading end 18 of decorative cover member 14 (see FIG. 2A) is secured by any suitable means to boot 16; preferably, said leading end 18 overlies and conceals from view said boot 16 as depicted. More particularly, the leading edge of said leading end underlies a middle section of boot 16 as shown so that said leading edge is disposed in sandwiched relation between said middle section and the leading edge of the pre-existing convertible top. In this way, a factory-provided seal between the leading edge of the pre-existing convertible top and an uppermost edge of a windshield is not disturbed or broken. Thus, it is a simple matter to clip boot member 16 to the leading end of the pre-existing convertible top, thereby securing the leading end of decorative cover member 14 thereto. Wind cannot enter into the space between decorative cover member 14 and the pre-existing top because boot 16 is molded to closely fit the leading edge of the car roof. The cross-sectional shape of boot 16 will vary from that depicted.

The side edges of decorative cover member 14 are releasably secured to the respective side edges of the pre-existing cover by a plurality of clips, one of which is depicted in side elevation in FIG. 3. Each clip 20 is preferably formed of spring steel and has a general "U"-shape as depicted. Advantageously, each clip 20 is covered with a suitable fabric 22. Existing convertible top 24 is clampingly engaged by the opposed arms of clip means 20, and decorative cover member 14 is sewn, adhered, or otherwise secured to a preselected outer surface of one of said opposing arms of said clip means 20. Thus, attaching a clip means 20 to existing top 24 is a very simple matter, and such attachment secures decorative cover member 14 in overlying relation to existing top 24.

Figure 4:
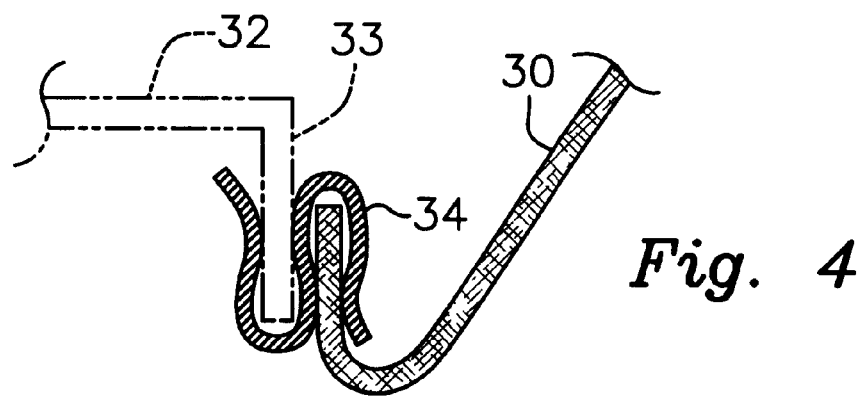
FIG. 4 is a side elevational view of a third clip means that secures a trailing end of the decorative cover member to an existing storage well of the convertible top automobile.

Trailing end 30 of decorative cover member 14 is held securely in place by the means disclosed in FIG. 4. A pre-existing storage well for receiving existing top 24 is lined with a metal frame 32 having an angular construction as depicted in said FIG. 4. Generally "S"-shaped clip member 34, preferably formed of spring steel, has a downwardly-opening leading part that clampingly engages said trailing end 30 of decorative cover member 14; it also has an upwardly-opening trailing part that clampingly engages a vertical wall 33 of storage well frame 32 as depicted. Clamp 34 may be a single clamp that extends the width or breadth of the trailing end of the convertible top. Alternatively, the clamping function may be performed by a plurality of smaller clamps, each of which has a nominal width relative to the width of the convertible top, i.e., clamp 34 could be provided in the form of a plurality of clamps each of which is substantially the size of side clip means 20.

Thus, three simple clips or clamping means enable quick and easy installation of decorative cover member 14 over existing convertible top 24. Molded boot 16 provides the first clip means, "U"-shaped clamps 20 provide the second clip means, and "S"-shaped clamps 34 provide the third clip means.

It should be understood, however, that differing makes and models may require differing clamping means and that the invention is not limited to the specific clips or clamps depicted and described herein.

Figure 5:
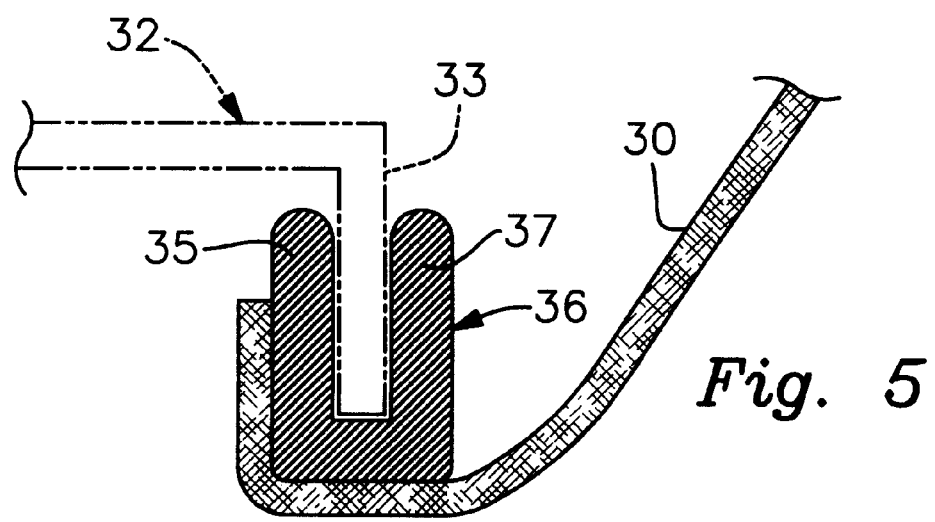
FIG. 5 is a side elevational view of a fourth, alternative clip means for securing a trailing end of said decorative cover member to said existing storage well.

For example, FIG. 5 depicts a clamping means that performs the function of clip 34 (FIG. 4), but in a different way. In this alternative embodiment, trailing end 30 of decorative cover member 14 is adhered or otherwise secured to clip means 36 which has two parallel, transversely opposed arms 35, 37 that releasably capture said vertical wall 33 of storage well 32. Thus, only one clipping action is needed to secure trailing end 30 in this embodiment, as distinguished from two clipping actions needed in the embodiment of FIG. 4.

In models having storage wells of different constructions, different clips might be needed but such different clips fall within the scope of this invention. Moreover, in some models, such as the Porsche, the existing convertible top completely covers the rear well. In that situation, the novel decorative cover could not be attached to said rear well. However, pre-existing snaps are provided on the body of the Porsche convertible and the trailing end of the novel convertible top of this invention would attach to those snaps. Thus, it should be understood that differing attachment means are needed for different makes and models, as aforesaid, but all such differing attachment means are well within the scope of this invention.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device for enhancing the appearance of a pre-existing convertible top, comprising:

a flexible cover member having a shape and size that substantially conforms to the shape and size of said pre-existing convertible top;

a first clip means formed of a flexible and resilient material;

said first clip means being a molded boot having a middle section of breadth substantially equal to a breadth of said pre-existing convertible top, said middle section overlying a leading edge of said pre-existing convertible top and said molded boot having opposed end sections that overlie and frictionally engage opposing side edges of said pre-existing convertible top;

a leading edge of said flexible cover member disposed in underlying relation to said middle section of said molded boot, securely sandwiched between said middle section of said molded boot and a leading edge of said pre-existing convertible top;

a second clip means;

attaching means for attaching a side edge of said flexible cover member to a preselected surface of said second clip means;

said second clip means adapted to releasably engage a side edge of said pre-existing convertible top; and a third clip means for securing a trailing end of said flexible cover member into overlying relation to a trailing end of said pre-existing convertible top;

whereby said flexible cover member is quickly and easily releasably attachable to said pre-existing convertible top.

2. The device of claim 1, wherein said second clip means is a cloth-covered clip member and wherein said attaching means includes interconnecting means for interconnecting said flexible cover member and said preselected surface of said cloth-covered clip member.

3. The device of claim 1, wherein said third clip means is formed of a flexible and resilient material;

said third clip means having a first part adapted to releasably engage a storage well for said pre-existing convertible top; and said third clip means having a second part adapted to releasably engage a trailing end of said flexible cover member.

4. The device of claim 2, wherein said interconnecting means includes an adhesive.

5. The device of claim 2, wherein said interconnecting means includes a sewn connection.

6. The device of claim 2, wherein said cloth-covered clip member is made of a spring steel.

7. The device of claim 1, wherein said third clip means includes an "S"-shaped clip member having a first, trailing end adapted to releasably engage an inside edge of a pre-existing storage well and having a second, leading end adapted to releasably engage said trailing edge of said flexible cover member.

8. The device of claim 7, wherein said "S"-shaped clip member has a breadth substantially equal to a breadth of said pre-existing convertible top.

9. The device of claim 7, wherein there are a plurality of said "S"-shaped clip members, each of nominal breadth compared to a breadth of said pre-existing convertible top, and each of said "S"-shaped clip members being laterally spaced apart from one another along a breadth of said trailing edge of said pre-existing convertible top.

10. A system for covering a pre-existing convertible top with a decorative cover to enhance the decorative appeal of a convertible top automobile, comprising:

a molded boot having a middle section that overlies and frictionally engages a leading edge of a pre-existing convertible top;

said molded boot having opposing ends formed integrally with said middle section, said opposing ends overlying and frictionally engaging opposed side edges of said pre-existing convertible top;

a decorative cover member having substantially the same size and shape of said pre-existing cover, said decorative cover member adapted to overlie said pre-existing convertible top;

a leading edge of said decorative cover member disposed in underlying relation to said middle section of said molded boot and being sandwiched between said middle section of said molded boot and said leading edge of said pre-existing convertible top;

a plurality of side clip members adapted to engage opposing side edges of said pre-existing convertible top;

said decorative cover member being secured at spaced intervals along its opposing side edges to said side clip members; and an end clip means for securing a trailing edge of said decorative cover member to a pre-existing part of said convertible top automobile.

11. The system of claim 10, wherein each side clip is generally "U"-shaped.

12. The system of claim 10, wherein said end clip means is a single clip having a breadth substantially equal to a breadth of said pre-existing convertible top.

13. The system of claim 12, wherein said single clip is generally "S"-shaped, a trailing end thereof engaging a pre-existing storage well and a leading end thereof engaging said trailing end of said decorative cover member.

14. The system of claim 10, wherein said end clip means includes a plurality of "S"-shaped clip members, each of which has a breadth that is nominal compared to a breadth of said pre-existing convertible top.

15. The system of claim 10, wherein said end clip means includes a "U"-shaped clip having a pair of parallel, transversely opposed arms that releasably capture a preselected part of a pre-existing storage well, said trailing edge of said decorative cover member being secured to said "U"-shaped clip.

* * * * *